United States Patent Office 3,130,173

Patented Apr. 21, 1964

3,130,173

COMPOSITION FOR POTTING COMPONENTS OF ELECTRIC CIRCUITS

Philip J. Franklin, Los Angeles, Calif., and Morris Weinberg, Bronx, N.Y., assignors to the United States of America as represented by the Secretary of the Army No Drawing. Filed May 7, 1948, Ser. No. 25,776
5 Claims. (Cl. 260—33.6)
(Granted under Title 35, U.S. Code (1952), sec. 266)

The invention described herein may be manufactured and used by or for the Government for governmental purposes without the payment of any royalty thereon.

This invention relates to a method of potting components of electric circuits and to compositions of matter for use in practicing the method.

As used herein "potting" of components of an electric circuit means the submerging of the components in a mass of unsolidified matter in liquid or semi-liquid condition followed by solidification of the said mass of matter while the components are submerged therein, whereby the components are inclosed within and rigidly held by a mass of solidified matter. The term "submerging" is intended to include not only the act of placing or sinking the said components within the mass of matter in unsolidified condition prior to solidification thereof, but also the act of pouring or flowing the unsolidified mass of matter about the components, to encompass or envelop them prior to solidification, whereupon when solidification is effected in either instance the said components become encompassed or embedded in a solidified mass of matter.

As examples of components of electric circuits which may be potted according to the present invention may be mentioned resistors, capacitors, inductances, vacuum tubes either of the high vacuum type or the gas containing type and transformers, but it is to be understood that the present invention is not limited to the potting of these components of electric circuits but may be used for potting other components where the potting of such other components is desirable or advantageous.

In the appended claims and in this description of the invention, wherever the context permits, the expression "components of electric circuits" is intended to include the components as separate parts or elements, components electrically connected, parts of an electrical circuit including one or more components, as well as complete electric circuits.

The present invention especially concerns the potting of components of electric circuits of electric fuzes for bombs, rockets and projectiles, which initiate the detonation of the bursting charge thereof in proximity of the target, and sometimes referred to in the art as proximity fuzes, although it is to be understood that the invention may be used for the potting of the electrical components of all types of electric fuzes, whether or not of the proximity type, and to the potting of components of electric circuits of other devices.

It was found that exacting mechanical and electrical stability requirements of electric fuzes for missiles, particularly proximity fuzes, operating on principles involving the use of high frequency currents, necessitated potting of the circuit components. Due to the high impedances that are involved in the circuits of proximity fuzes, the electrical loss factor or the dissipation of the available energy in the casting or potting compound was found to be of major importance. In addition to this, the casting or potting compound must have such mechanical characteristics to resist without fracture, and to protect the electric components embedded therein against, the forces which act upon the missiles at the time they start their flight or which originate in flight. These forces may, for example, be forces of setback originating when the missiles are fired from cannon, centrifugal forces due to rotation of the missiles in flight, and forces due to vibration of the missiles in flight. The few materials which were heretofore known to have adequate electrical properties for potting components of electric circuits were mechanically deficient for potting electric components of electric fuzes, particularly fuzes of the proximity type. A further characteristic that a potting or a casting compound or material should possess is that it must have such a viscosity, prior to its solidification, that when poured into a container housing the electrical component, circuit or electronic device, or when the electrical component, circuit or electronic device is submerged in a body of the compound or material in a container, it will flow around and completely encompass, without leaving voids, all the electrical elements or components to be potted. Still another requirement of a potting method or material is that the potting material used must harden to a rigid solid without adversely affecting the operation of the circuit components or the circuits in which the components are employed.

The most important properties specifically desired of a potting resin when utilized in the potting of high-frequency, high-impedance components or circuits, such as may be found in proximity fuzes and in other electronic devices, may be summarized as follows: (1) low power factor, (2) low dielectric current, (3) short solidification or polymerization period at low temperature and atmospheric pressure, (4) high impact strength, (5) small volume shrinkage on solidification or polymerization, (6) dimensional and electric stability, and (7) low moisture absorption. Further, the composition of matter which is solidified or polymerized to form the resin or resinous material should be of a liquid nature and have the properties of low viscosity and low surface tension before solidification or polymerization, so that the composition may be poured or caused to flow through small openings or passages and may completely surround and envelop the components of electric circuits without leaving voids.

We have discovered that all of the properties considered above are obtained by low temperature polymerization of polymerizable compositions of matter consisting essentially of an intimate mixture of styrene monomer, polystyrene (preferably of molecular weight of 85,000 to 100,000), an isomer of dichlorostyrene or mixed isomers thereof, for example, 2,5-dichlorostyrene, a polydichlorostyrene or a polymer of mixed isomers of dichlorostyrene, for example, 2,5-polydichlorostyrene, and a plasticizer, with or without the inclusion therein of divinylbenzene, in the form of mixed isomers or of individual isomers, to produce cross-linkage in the final products or resins produced on polymerization of the compositions. The preparation of the compositions is relatively simple. Immediately after putting the components of the composition together in a cylindrical mixing vessel, the mixing vessel is rotated about its cylindrical axis disposed horizontally, whereby clumping of the components is avoided, and the rotation of the mixing vessel is continued until a viscous dispersion or viscous liquid homogeneous mass is formed. Following about sixteen hours of continuous rotation of the vessel, the polymerizable composition is ready for use as a potting composition, requiring only the proper quantity of catalyst to initiate polymerization.

The viscous liquid composition, prepared as above described, may be stored at 0° C. for a few months without a catalyst, and for a few weeks with a catalyst before the viscosity increases to a point where pouring is difficult. At room temperature, the catalyzed composition gradually increases in viscosity and must be used in a day or two.

The polymers of styrene and of dichlorostyrene used in the composition act as fillers to reduce the overall shrinkage due to polymerization. The rate of polymerization of the styrene in the composition is accelerated by the dichlorostyrene and the divinylbenzene. The dichlorostyrene serves also to reduce flammability, as well as to permit the use of divinylbenzene as a cross-linking agent, since the presence of dichlorostyrene completely avoids or removes the "cauliflower" effect produced when divinylbenzene is polymerized with styrene at a low temperature. By producing cross-linkage in the final polymerized product, the divinylbenzene imparts to the final product certain thermosetting characteristics that slightly increase the heat distortion point. The extent to which the above considered properties are developed in the solid polymerized product may be varied by varying the relative proportions of the ingredients of the polymerizable composition and by using different plasticizers. In general, the electrical properties of the polymerized product are affected only to a minor extent by the method of polymerization employed, but if the temperature during polymerization is permitted to rise too high the final polymerized product is deficient in mechanical strength. Details as regards polymerization are hereinafter given.

A polymerization catalyst, preferably an organic peroxide catalyst, for example, benzoyl peroxide, lauroyl peroxide, butyl hydroperoxide, caproyl peroxide and caprylyl peroxide, is intimately mixed with and dissolved in the polymerizable composition before it is used for potting components of electric circuits. After this addition of catalyst, components of electric circuits are submerged in the composition or the composition is caused to flow around and encompass the said components, whereupon polymerization of the composition is effected at low temperature. If the components of the electric circuit are not already located in a container which will receive and hold the composition which is flowed around them, and it is desired to surround them with the potting composition, the components may be submerged in the composition which has been placed in a container, or the components may first be placed in the container and the composition then poured into the container. The container may be made of easily frangible material, such as glass, so that it may be broken away from the polymerized composition or the container may be formed of a relatively infrangible material which may be permitted to remain attached to the polymerized resin surrounding the electrical components. Also lubricated molds, which permit the polymerized composition to be removed from the molds, may be used in the potting of components of electric circuits instead of the containers referred to above. It is perhaps needless to state that the containers or molds should have the shape which is desired to be given to the final potted product.

When components of electric circuits are to be suspended more or less at the center of a mass of the potting composition or resin, it is advisable first to gel a portion of the composition in a container or mold by partial polymerization and then allow the gelled composition to support the components, whereupon further quantities of the polymerizable composition are poured into the mold or container to the desired extent or level; thereafter polymerization is effected at low temperature until the whole of the polymerizable composition in the container or mold becomes a solid mass. No visible line of demarkation appears between the preliminarily gelled portion of the solidified mass and the remainder of the solidified mass.

As has been indicated above, the polymerization of the composition is effected at low temperature. Preferably this temperature should not exceed 60° C. As the polymerization reaction is exothermic and the resultant heat catalyzes the reaction, it is advisable to effect polymerization at a low temperature and with a minimum amount of catalyst. Otherwise the reaction may become auto-catalytic with an increasing rate causing the final product to be cloudy, to contain many small bubbles, to be deficient in mechanical strength and to give the appearance of being burned. For very large casting or polymerized masses, a small amount of catalyst is used, and the casting is permitted to gel at room temperature thus helping to prevent auto-catalytic effect. Since air has a slight inhibitory effect on the polymerization, the surface of the composition may be either covered with cellophane or flooded with glycerol after initial gelation has occurred, if a hard surface is desired. Polymerization of the catalyzed composition would be faster if effected at 100° C. but the polymerized product would contain many small bubbles, whereas when the polymerization is effected at about 60° C. or below, bubble formation in the polymerized product does not occur.

Small volumes of the composition described herein are best polymerized in an oven or chamber at 50° to 60° C. by using 0.1% to 0.5% benzoyl peroxide as the catalyst. The catalyst may be stirred into the composition a day before intended use, thus permitting all the bubbles stirred into the composition to disappear. However, this is not absolutely necessary, since all bubbles will be released by the composition prior to gelation. The polymerization is usually completed in 12 to 20 hours.

Large volumes of the composition are best polymerized by initially polymerizing the catalyzed composition (containing, e.g., 0.05 to 0.5% benzoyl peroxide) in a chamber at 30° C. for 2 to 3 days, whereupon the temperature of the chamber should be raised to 50° to 60° C. for 12 to 20 hours.

As has been stated above, the electrical properties of the polymerized composition are affected only to a minor extent by the method of polymerization. Therefore the length of time for polymerization of the composition should be the minimum required for the chain length of the polymer to build up to a point beyond which there is no improvement in mechanical properties and all monomers are eliminated. The minimum time, however, varies with the catalyst, the percentage of catalyst used, and the temperature at which the polymerization is initiated and carried out. In addition the size of the mass of composition to be polymerized must be considered, taking into account the effects of auto-catalysis.

When employing the within described method and composition for the potting of glass vacuum tubes, or circuits or parts of circuits including such tubes, proper protection for such tubes, such as rubber jackets or jackets of other resilient or shock absorbing material are placed on the tubes, preferably completely surrounding their glass portions, to prevent possible cracking by thermal influences and mechanical shock. All sharp corners should be eliminated from any object that is to be potted, as strains set up at these points may cause crazing. In order to eliminate or reduce these strains, and to obtain maximum hardness and polymerization of the resinous material surrounding the article or articles potted, it is advisable to cure the resinous material for a few days after the polymerization by maintaining it during such time in an oven at a temperature of 50° to 60° C.

Examples I and II below each give, by way of illustration, the ingredients and their proportions that may be used in preparing a polymerizable composition according to the present invention. The two compositions of Examples I and II are particularly useful in potting components of electric circuits wherein high-frequency currents and high impedances are employed. The ingredients are compounded and used after compounding in the manner described above.

*Example I*

| | Parts by weight |
|---|---|
| Styrene monomer | 21.0 |
| Polystyrene | 11.0 |
| 2,5-dichlorostyrene | 33.0 |
| Poly 2,5-dichlorostyrene | 21.5 |
| Hydrogenated terphenyl | 13.0 |
| Solution of divinylbenzene of the composition given below | 0.5 |

*Example II*

| | Parts by Weight | Percent by Weight |
|---|---|---|
| Styrene monomer | 25.0 | 21.2 |
| Polystyrene | 15.5 | 13.1 |
| 2,5-dichlorostyrene | 37.5 | 31.8 |
| Poly 2,5,-dichlorostyrene | 25.0 | 21.2 |
| Diamylnaphthalene | 15.0 | 12.7 |

In Examples I and II, the hydrogenated terphenyl and the diamylnaphthalene function as plasticizers.

The solution of divinylbenzene referred to in Example I consists of 45% divinylbenzene (mixed isomers), 47% ethylvinylbenzene (mixed isomers) and 8% diethylbenzene (mixed isomers). In this solution the isomers of divinylbenzene are present in about the following proportions based upon the total of all the isomers thereof present: 60% of the meta isomer, 30% of the para isomer and 10% of the ortho isomer. The hydrogenated terphenyl of Example I consists of a mixture of isomeric terphenyls (diphenyl benzenes) partially hydrogenated to forty percent saturation.

The compositions of Examples I and II, after mixing as described above, are mixed with about 0.1 percent benzoyl peroxide and polymerized as above described in an oven at about 60° C. Polymerization becomes complete in about eight hours. The final solid resinous product resulting from the use of the ingredients and proportions of Example I has the following physical and electrical properties:

| | |
|---|---|
| Compressive strength, lb./in.$^2$ | 17,100 |
| Izod impact, ft. lb./in. of notch | 0.228 |
| Coefficient of thermal expansion per ° C. (approx.) | $11\times10^{-5}$ |
| Water absorption (24 hour immersion), percent | 0.01 |
| Volumetric shrinkage on polymerization, percent | 8.0 |
| Heat distortion, ° C | 68 to 70 |
| Power factor (at 100 megacycles and 50% relative humidity) | 0.0004 to 0.0008 |
| Dielectric constant (at 100 megacycles and 50% relative humidity) | 2.5 |
| Dielectric strength (1/16 inch sample; volts/mil) | 610 to 660 |
| Volumetric resistivity, megohm-cm | $10^{17}$ |

The physical and electrical properties of the solid resinous product resulting from the use of the ingredients and proportions of Example II are about the same as those of the resinous product resulting from the use of the ingredients and proportions of Example I.

In practicing the present invention, it may be found necessary to subject the 2,5-dichlorostyrene and styrene to special treatment before using them, as they may contain an excessive amount of inhibitor which, if not removed, will interfere with the polymerization and electrical properties of the composition. The inhibitor may be conveniently removed by treating the monomers with a 10 percent aqueous sodium hydroxide solution, followed by washing and drying.

In the event that the organic peroxide catalyst, such as benzoyl peroxide, is produced admixed with a filler, it is advisable and preferable to remove the filler before using it as a catalyst in the present invention. To this end, the mixture of filler and benzoyl peroxide is treated with acetone to dissolve the benzoyl peroxide, whereupon, after separating the acetone solution of benzoyl peroxide from the filler, the benzoyl peroxide is precipitated from the acetone solution by the addition of water thereto. The precipitated benzoyl peroxide is separated by filtration from the mixture of acetone and water, washed and dried.

The special features of the composition of the present invention make feasible many new applications of electronic devices. By rigidly embedding electronic circuits or even complete plug-in sub-assemblies, the composition provides excellent electrical insulation as well as protection against rough handling and deteriorating atmosphere conditions. It is particularly well adapted for use with subminiature electronic equipment built by the printing technique. The potting composition of the invention may also be used in high-impedance control devices in heavy industry to provide adequate protection against vibration, acid fumes, high humidity, salt spray and other conditions that are encountered in steel mills, plating plants, and other industrial plants. Other uses include the potting of components and sub-assemblies for radar equipment, hearing aids, portable radio transmitters and receivers and subminiature electronic control devices. The composition is also useful as an electric cell and battery sealing compound.

We claim:

1. A composition of matter comprising a viscous homogeneous liquid mixture of about 21 percent of styrene monomer, about 11 percent of polystyrene, about 33 percent of 2,5-dichlorostyrene, about 21.5 percent of poly 2,5-dichlorostyrene, about 13.0 percent of hydrogenated terphenyl and about 0.225 percent of divinylbenzene.

2. A composition of matter comprising a viscous homogeneous liquid mixture of about 21.2 percent of styrene monomer, about 13.1 percent of polystyrene, about 31.8 percent of 2,5-dichlorostyrene, about 21.2 percent of poly 2,5-dichlorostyrene, and about 12.7 percent of diamylnaphthalene.

3. A composition of matter comprising a viscous homogeneous liquid mixture of between about 21 and 21.2 percent of styrene monomer, between about 11 and 13.1 percent of polystyrene, between about 31.8 and 33 percent of 2,5-dichlorostyrene, between about 21.2 and 21.5 percent of poly 2,5-dichlorostyrene, and between about 12.7 and 13 percent of a plasticizer chosen from the group consisting of hydrogenated terphenyl and diamylnaphthalene.

4. The composition of matter as set forth by claim 3 further comprising a small amount of an organic hydroperoxide as a polymerization catalyst.

5. The composition of matter as set forth by claim 3 further comprising as a polymerization catalyst a small quantity of a member of the group consisting of benzoyl peroxide, lauroyl peroxide, butyl hydroperoxide, caproyl peroxide and caprylyl peroxide.

References Cited in the file of this patent

UNITED STATES PATENTS

| | | |
|---|---|---|
| 2,284,335 | Meyer | May 26, 1942 |
| 2,287,201 | Scott et al. | July 14, 1942 |
| 2,364,719 | Jenkins | Dec. 12, 1944 |
| 2,365,646 | New | Dec. 19, 1944 |
| 2,390,437 | Hayes | Dec. 4, 1945 |
| 2,398,736 | Driesbach | Apr. 16, 1946 |
| 2,406,319 | Brooks | Aug. 27, 1946 |
| 2,418,978 | Mertens | Apr. 15, 1947 |
| 2,479,130 | Moose | Aug. 16, 1949 |

OTHER REFERENCES

Russell et al.: "Plastics and Resins," volume 5, No. 12, November-December 1946, pages 5, 29 and 30.